United States Patent Office 3,049,523
Patented Aug. 14, 1962

3,049,523
OZONOLYSIS OF POLYCHLOROPRENE
Philip A. Roussel, Brandywine Hundred, Del., assignor to E. I. du Pont de Nemours and Company, Wilmington, Del., a corporation of Delaware
No Drawing. Filed Feb. 15, 1960, Ser. No. 8,518
3 Claims. (Cl. 260—92.3)

This invention relates to novel polymers and more particularly to carboxy- or carboxylic acid chloride-terminated polymers which are obtained by a controlled ozonolysis of polychloroprene.

Homopolymers of chloroprene (2-chloro-1,3-butadiene) are highly useful elastomers. However, for certain applications of polychloroprene, it would be desirable to have a pourable fluid polymer which may be readily cured to an elastic insoluble final product. Such a pourable fluid polymer could be used as a caulking or potting composition. In general, polychloroprenes which possess the desired fluid properties have not been curable to elastic insoluble final products having satisfactory properties for practical use.

It is an object of the present invention to provide a novel carboxy- and/or carboxylic acid chloride-terminated polymer. A further object is to provide such a polymer which is a pourable fluid material and which can readily be cured to an elastomer having desirable physical properties. A still further object is to provide a process for preparing such polymers from high molecular weight chloroprene polymers. Other objects will appear hereinafter.

These and other objects of this invention are accomplished by the novel polymeric composition having the formula

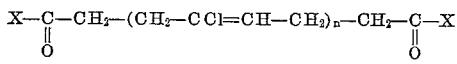

wherein X is independently selected from the group consisting of —OH and —Cl and $n$ is an integer having a value so that the number average molecular weight of the polymer ranges from about 1800 to 18,000. In other words, $n$ has a value of from about 20 to 200.

The novel polymers of the present invention are prepared by dissolving a high molecular weight polychloroprene in a solvent, introducing ozone into the solution and, after the desired amount of ozone has been allowed to react, removing the solvent and recovering the polymer. The ozone attacks the polychloroprene at the chlorine bearing double bonds with the result that the product of the ozonolysis is a polymer having one carboxylic acid chloride group and one carboxy group. The carboxylic acid chloride group may be converted on hydrolysis to a carboxy group or the carboxy group converted to a carboxylic acid chloride group by treatment with thionyl chloride. These conversion procedures are well-known in the art.

As mentioned above, the novel polymers of the present invention have a number average molecular weight of from about 1800 to 18,000. Thus, the average value for $n$ in the general formula ranges from about 20 to 200. The molecular weights are determined from the weak acid equivalent weights which may be determined by conventional procedures. One method is by dissolving one to two grams of the polymer in about 75 ml. of monochlorobenzene and titrating potentiometrically with 0.1 N alcoholic potassium hydroxide. The first end point in the titration curve is the strong-acid end point and represents the point at which the carboxylic acid chloride groups have been hydrolyzed to yield the carboxylic acid group and chloride ion. The neutralization of any hydrochloric acid present will also contribute to the first strong-acid titration curve. The second end point is the weak-acid end point and represents the point at which the weaker carboxylic acid groups are neutralized. From the number of milliliters of 0.1 N potassium hydroxide required to titrate the material from the strong-acid end point to the weak-acid end point, the weak acid equivalent weight is calculated. Since the polymer, on hydrolysis, contains two carboxylic acid groups, the molecular weight is twice the equivalent weight.

The high molecular weight polychloroprenes which are used as starting materials for preparing the novel polymers of the present invention are the homopolymers of chloroprene prepared by an emulsion polymerization of chloroprene as described in the prior art. Methods for preparing polychloroprenes are described in "Synthetic Rubber," chapter 22, G. S. Whitby, published by John Wiley & Sons, Inc., N.Y., 1954, and U.S. Patents 2,494,087, 2,426,854, 2,417,034 and 2,264,173. In general, any of these high molecular weight polychloroprenes may be used. These high molecular weight polychloroprenes are dissolved in a solvent such as chloroform, carbon tetrachloride or the lower saturated hydrocarbons such as pentane, hexane and cyclohexane. The amount of solvent employed is not critical so long as it is sufficient to dissolve the polychloroprene. The concentration of polychloroprene in the solvent should be about 10 to 30 percent by weight. Above 30 percent the solution becomes inconveniently viscous and there is no advantage to using a more dilute solution than 10 percent. Ozone is then introduced into the solution. This may be accomplished by using an ozone generator and introducing an oxygen stream containing ozone. The ozone concentration in the oxygen stream is not critical but should range from about 1.0 to 5.0 percent by weight.

The amount of ozone employed will depend on the molecular weight of the starting material and the desired molecular weight of the final product. This amount may be established by using the following approximate ratio:

$$\frac{\text{Number average molecular weight of starting material}}{\text{Number average molecular weight of final product}} - 1 = \text{number moles of ozone}$$

The ozonolysis may be carried out at any convenient temperature and pressure. It is preferable to conduct the ozonolysis at ambient temperature and pressure. If desired, temperatures ranging from about 0 to 50° C. may be used. Also, pressures either lower or higher than normal atmospheric pressure may be employed. After ozonolysis, stabilizers may be added as a precaution to prevent harmful effects of hydrogen chloride which might be derived from the carboxylic acid chloride groups reacting with traces of moisture. Suitable stabilizers are 2,2'-methylenebis(6-tert-butyl-p-cresol) and dibutyltin dilaurate.

After the ozonolysis is complete the solvent may then be removed by known methods such as evaporation or distillation. As noted above, the attack of the ozone on the polychloroprene is at the chlorine bearing double bonds. Accordingly, the resulting polymers contain an average of one carboxylic chloride acid group and one carboxy group. The carboxylic acid chloride group, on hydrolysis, yields a carboxy group or the carboxy group, on reaction with thionyl chloride, yields a carboxylic acid chloride group.

The novel polymers of the present invention are fluids having viscosities depending upon the molecular weight. The term "fluid" indicates that these novel polymers are pourable at temperatures of about 20 to 25° C. These polymers may be cured by utilizing any of the well-known curing procedures for neoprene including the use of neoprene curing and compounding agents. Thus, these novel polymers may be blended with conventional reinforcing agents such as carbon black, titanium dioxide or clay and they may be cured to elastomeric products by means of conventional curing agents such as zinc oxide, magnesium oxide or organic diamines. Suitable diamines include p-phenylenediamine, 1,6-hexanediamine and triethylenetetramine. Curing of the polymers may be effected by heating in a mold in a press at temperatures ranging from about 125 to 200° C. When the novel polymers are compounded with zinc oxide, magnesium oxide and 1,6-hexanediamine or triethylenetetramine, curing will take place at 20 to 25° C. In these instances the polymer loses tack within a few hours and after several days it is a solid rubbery material.

The polymers of this invention are useful in all applications where it is desirable to have a fluid material which is curable to an elastomeric product. Such applications include use in sealants, caulking compositions, potting compositions, and as plasticizing agents in other elastomers. Polymers having an average molecular weight below about 1800 cure to elastomeric materials of less desirable final properties. The polymers of average molecular weight greater than about 18,000 are too viscous and less suitable for applications requiring fluid, pourable materials.

The following examples will better illustrate the nature of the present invention; however, the invention is not intended to be limited to these examples. Parts are by weight unless otherwise indicated.

EXAMPLE 1

A solution of 450 g. of polychloroprene in 1500 ml. of chloroform was prepared by adding the polychloroprene, in three portions of 150 g. each at one-hour intervals, to the solvent while stirring. The polychloroprene used was a polymer of chloroprene having a number average molecular weight of about 225,000 to 250,000, prepared as described in U.S. 2,494,087. After all of the polychloroprene had been added, 16.6 g. of dibutyltin dilaurate was added as a stabilizing agent. The polychloroprene was completely dissolved after stirring for 6 hours at 25° C. Ozone (2 percent by weight ozone in a stream of oxygen obtained from a conventional ozone generator) was bubbled through the solution, while stirring, over a period of 70 minutes. The total quantity of ozone added was 4.8 g. (about 50 moles per mole of polychloroprene). 4.5 grams of 2,2'-methylenebis(6-tert-butyl-p-cresol) was added as a stabilizer, and the solvent was removed under a pressure of about 20 mm. Hg.

The polymer was a viscous brown liquid having an intrinsic viscosity in toluene at 30° C. of 0.18. The product had a number average molecular weight of about 5,000 as determined from the weak acid equivalent weight. The polymer contains an average of one carboxylic acid chloride terminal group and one carboxy terminal group.

A sample of this polymer was cured by adding compounding ingredients as shown in Table I. The solid ingredients were mixed into the polymer, placed on a rubber roll mill, and heated at 100° C. for one-half hour. After cooling, the polymer had sufficient body for conventional milling. Easy processing carbon black, where used, was then added, and the polymer was milled. Test pieces were cured in a mold in a press at 160° C. for the times shown in Table I. The tensile properties are shown in Table I.

*Table I*

| Parts per 100 parts of Polymer | | | | | Cure, Minutes | Tensile Strength at Break, p.s.i. | Elongation at Break, percent | Modulus at 100% elongation, p.s.i. |
| --- | --- | --- | --- | --- | --- | --- | --- | --- |
| MgO | ZnO | PPD [1] | TTA [2] | EPC [3] | | | | |
| 4.0 | 5.0 | 2.02 | | | 30 | 370 | 280 | 200 |
| 4.0 | 5.0 | 2.02 | | | 60 | 530 | 280 | 250 |
| 4.0 | 5.0 | | 2.35 | 30 | 30 | 1,790 | 260 | 550 |
| 4.0 | 5.0 | | 2.35 | 30 | 60 | 1,900 | 210 | 650 |
| 4.0 | 5.0 | 2.70 | | 30 | 90 | 1,575 | 210 | 750 |
| 4.0 | 5.0 | 2.70 | | 30 | 120 | 1,600 | 210 | 725 |

[1] p-Phenylenediamine.
[2] Triethylenetetramine.
[3] Easy processing channel black.

EXAMPLE 2

To an agitated solution of 900 grams of polychloroprene, of the same type as used in Example 1, in 3000 ml. of chloroform, at 25° C., was introduced a stream of 2 percent by weight of ozone in oxygen until 7.68 g. of ozone had been supplied (about 40 moles of ozone per mole of polychloroprene). To this solution was added, as stabilizers, 9.0 g. of 2,2'-methylenebis(6-tert-butyl-p-cresol) and 9.0 g. of dibutyltin dilaurate. The solvent was removed by heating at 60° C. under reduced pressure. The polymer was a dark viscous liquid having an intrinsic viscosity in toluene at 30° C. of 0.18. It had a number average molecular weight of about 8400 as determined from the weak acid equivalent weight, contained 36.5 percent chlorine and had an average of one carboxy terminal group and one carboxylic acid chloride terminal group.

100 parts of the polymer was blended with 4 parts of zinc oxide, 4 parts of magnesium oxide, and 4 parts of 1,6-hexanediamine. Samples were spread in grooves in wood and on an aluminum surface to observe their curing at room temperatures. In four to six hours the material was tack-free. After standing for ten days the samples had developed good elastic properties.

As many widely different embodiments of this invention may be made without departing from the spirit and scope thereof, it is to be understood that this invention is not limited to the specific embodiments thereof except as defined in the appended claims.

What is claimed is:

1. A process for the preparation of a polymer having the formula $$X-\overset{O}{\underset{\|}{C}}-CH_2-(CH_2-CCl=CH-CH_2)_n-CH_2-\overset{O}{\underset{\|}{C}}-X$$

wherein X is selected from the group consisting of —OH and —Cl, there being an average of one —OH for each —Cl, and $n$ is an integer of from about 20 to 200, which comprises dissolving a high molecular weight polychloroprene in a solvent, introducing ozone into the solution and, after the desired amount of ozone has reacted, removing the solvent and recovering the polymer, the desired amount of ozone being determined by the following ratio $$\frac{\text{Number average molecular weight of starting material}}{\text{Number average molecular weight of final product}} -1 = \text{number moles of ozone}$$

2. A process according to claim 1 carried out at a temperature of from about 0° to 50° C.

3. A polymer produced by the process of claim 1.

References Cited in the file of this patent

UNITED STATES PATENTS

| | | |
|---|---|---|
| 2,450,858 | Fitzpatrick | Oct. 5, 1948 |
| 2,811,551 | Coffman | Oct. 29, 1957 |
| 2,848,478 | Pratt | Aug. 19, 1958 |
| 2,858,323 | Smith | Oct. 28, 1958 |
| 2,870,200 | Kharasch | Jan. 20, 1959 |
| 2,877,212 | Seligman | Mar. 10, 1959 |

OTHER REFERENCES

Berichte, volume 75 (1942), pages 656–660, by Friedrich Asinger. (Copy in Library.)